United States Patent
Turner

[19]

[11] Patent Number: 6,155,017
[45] Date of Patent: Dec. 5, 2000

[54] TRUSS STRUCTURE

[75] Inventor: Daryl Turner, Phoenix, Ariz.

[73] Assignee: Powertrusion 2000, Scottsdale, Ariz.

[21] Appl. No.: 09/116,096

[22] Filed: Jul. 15, 1998

Related U.S. Application Data

[63] Continuation-in-part of application No. 08/782,329, Jan. 13, 1997, Pat. No. 5,870,877, which is a continuation-in-part of application No. 08/743,388, Nov. 4, 1996, Pat. No. 5,809,734.

[51] Int. Cl.⁷ .................................................. E04C 3/30
[52] U.S. Cl. ...................... 52/726.4; 52/309.9; 52/731.1; 52/733.1; 52/736.2; 52/736.4; 248/354.4; 403/371
[58] Field of Search ............................... 52/726.4, 731.1, 52/733.1, 736.1, 736.2, 736.3, 736.4, 738.1, 309.1, 309.9; 182/134–136, 221; 246/351, 354.4, 554.1; 249/160, 51, 48, 18; 403/109, 369, 371, 377, 374

[56] References Cited

U.S. PATENT DOCUMENTS

| | | |
|---|---|---|
| 213,715 | 3/1879 | Mengden . |
| 224,775 | 2/1880 | Fryer, Jr. . |
| 666,146 | 1/1901 | Lanz . |
| 1,445,938 | 2/1923 | Farrington . |
| 2,109,508 | 3/1938 | Schmittutz . |
| 2,870,793 | 1/1959 | Bailey . |
| 3,177,667 | 4/1965 | Liddell . |
| 3,270,480 | 9/1966 | Beecker . |
| 3,378,978 | 4/1968 | Durand . |
| 3,570,376 | 3/1971 | Overton, III . |
| 3,574,104 | 4/1971 | Medler . |
| 3,726,360 | 4/1973 | Price et al. . |
| 3,813,098 | 5/1974 | Fischer et al. . |
| 3,813,837 | 6/1974 | McClain et al. . |
| 3,970,401 | 7/1976 | Lubeck . |
| 4,142,343 | 3/1979 | Trafton . |
| 4,144,111 | 3/1979 | Schaerer . |
| 4,155,970 | 5/1979 | Cassell . |
| 4,194,338 | 3/1980 | Trafton . |
| 4,202,520 | 5/1980 | Loos et al. . |
| 4,211,692 | 7/1980 | Barkis et al. . |
| 4,312,162 | 1/1982 | Medney . |
| 4,347,090 | 8/1982 | Anderson et al. . |
| 4,458,455 | 7/1984 | Tollstoff de Voss . |
| 4,488,844 | 12/1984 | Baubles . |
| 4,583,359 | 4/1986 | Staeger . |
| 4,702,057 | 10/1987 | Phillips . |
| 4,738,058 | 4/1988 | Svensson . |
| 4,751,804 | 6/1988 | Cazaly . |
| 4,769,967 | 9/1988 | Bourrieres . |
| 4,803,819 | 2/1989 | Kelsey . |
| 4,846,908 | 7/1989 | Aldrich et al. . |
| 4,907,624 | 3/1990 | Jonasson . |
| 4,918,883 | 4/1990 | Owen et al. . |
| 4,939,002 | 7/1990 | Hilakos . |
| 5,175,971 | 1/1993 | McCombs . |
| 5,218,375 | 6/1993 | Hillman . |
| 5,218,810 | 6/1993 | Isley, Jr. . |
| 5,222,344 | 6/1993 | Johnson . |
| 5,228,251 | 7/1993 | Frigon . |
| 5,250,132 | 10/1993 | Lapp et al. . |
| 5,324,377 | 6/1994 | Davies . |
| 5,329,744 | 7/1994 | Sumter . |
| 5,339,594 | 8/1994 | Ventura-Berti . |
| 5,374,385 | 12/1994 | Binse et al. . |
| 5,379,566 | 1/1995 | Schworer . |
| 5,513,477 | 5/1996 | Farber . |
| 5,540,017 | 7/1996 | Eilam et al. . |
| 5,540,870 | 7/1996 | Quigley . |
| 5,546,707 | 8/1996 | Caruso . |
| 5,549,947 | 8/1996 | Quigley et al. . |
| 5,555,696 | 9/1996 | Morrison, III et al. . |

FOREIGN PATENT DOCUMENTS

| | | |
|---|---|---|
| 774805 | 1/1968 | Canada . |
| 24 36 547 | 4/1976 | Germany . |

OTHER PUBLICATIONS

Composite Power Corporation, "Energy Deliver System Engineered for the Environment", 4 pages.

*Primary Examiner*—Carl D. Friedman
*Assistant Examiner*—Yvonne M. Horton
*Attorney, Agent, or Firm*—Blakely, Sokoloff, Taylor & Zafman LLP

[57] ABSTRACT

A composite utility pole which has a polygonal shaped outer surface and a circular shaped inner channel. Also disclosed is a truss structure which can support an assembly such as a windmill power generator. The truss structure may include a plurality of composite beams that are coupled together by a coupler. Each composite beam may have a curvature along a longitudinal axis of the beam.

4 Claims, 13 Drawing Sheets

TRUSS STRUCTURE

CROSS-REFERENCE TO RELATED APPLICATIONS

This is a continuation-in-part application of application Ser. No. 08/782,329, filed Jan. 13, 1997, now U.S. Pat. No. 5,870,877, which is a continuation-in-part application of application Ser. No. 08/743,388, filed Nov. 4, 1996 now U.S. Pat. No. 5,809,734.

BACKGROUND OF THE INVENTION

1. Field of the Invention

The present invention relates to a utility pole constructed from a composite material.

2. Description of Related Art

Utility poles are typically constructed from wooden poles that are anchored into the ground. The utility poles will typically have arms that support a number of electrical power lines. The continuous exposure to harsh environmental conditions can cause the wood poles to rot and decay. To prevent rotting, the wood is sometimes treated with a carbon base material such as tar. It has been found that most conventional wood treating material is harmful to the environment. Additionally, it has been found that a significant amount of electrical current drains to the ground, thereby reducing the energy efficiency of the power system.

Metal poles have been installed to increase the life of the utility poles. Metal poles are highly conductive and generally create an unsafe environment for the utility personnel that maintain and repair the pole. Additionally, both metal and wooden poles are relatively heavy, typically requiring a crane to lift and install the poles.

U.S. Pat. No. 5,175,971 issued to McCombs discloses a hollow utility pole that is constructed from a composite material such as a resin impregnated fiber glass. The McCombs pole has a hexagonally shaped liner located within a hexagonally shaped primary pole. The outer primary pole has a plurality of dove tail grooves that allow arm attachments to be mounted to the pole. Additionally, the grooves allow personnel to climb the pole. The dove tail grooves create a number of rounded fingers located adjacent to thin neck portions of the primary pole.

It has been found that when forming the composite, the resin and glass fibers do not evenly flow into the neck and finger portions of the primary pole. The uneven resin flow and glass fiber distribution can reduce the structural integrity of the pole. The rounded finger portions also add thickness and weight to a utility pole that can be 40 feet in length.

The hollow McComb utility pole has relatively low bending and torsional stiffnesses. The relatively low stiffness must be compensated for by a thicker wall. Increasing the thickness of the wall increases the weight of the pole. It would be desirable to provide a relatively strong, lightweight utility pole which can be efficiently constructed from a composite material.

Windmill power generators typically include one or more blades that are coupled to a generator. The generator creates electricity when the blades are rotated by wind forces. The generator is typically elevated by a steel truss structure to provide clearance for the blades. The truss structure must be strong enough to support the generator which is relatively heavy. The loads on the structure are increased when the truss and generator are subjected to the wind forces. The truss structure is typically stabilized by a plurality of guide wires which are attached to the truss and tethered to the ground.

The generators must be periodically lowered to the ground for repair or maintenance of the assembly. The truss structure may have hinges which allow the generator to be lowered to the ground. The generator is typically lowered by pulling one of the guide wires. Pulling a heavy truss structure to the ground can create safety issues for the personnel performing the task. It would be desirable to provide a lightweight truss structure which can adequately support an assembly such as a windmill power generator.

SUMMARY OF THE INVENTION

One embodiment of the present invention is a composite utility pole and other uses which has a polygonal shaped outer surface and a circular shaped inner channel.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
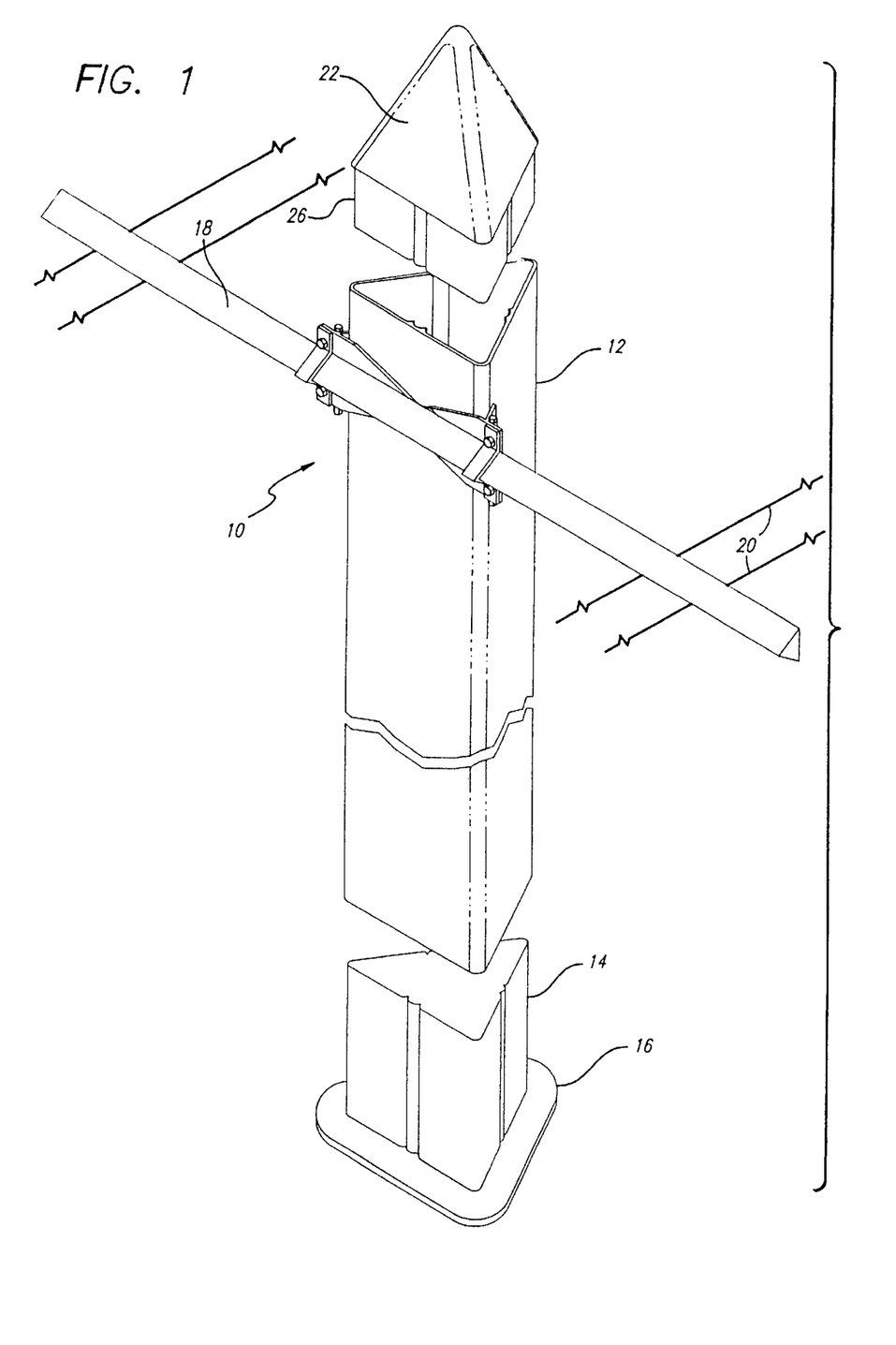
FIG. 1 is a perspective view of a telephone pole of the present invention.

Referring to the drawings more particularly by reference numbers, FIG. 1 shows a utility pole assembly 10 of the present invention. The components of the pole assembly 10 are constructed from a composite material such as a glass reinforced resin. The outer surface of the composite material is typically smooth so that animals do not climb the pole. Additionally, the composite material will not carry bacteria or create slivers which can be harmful to the utility personnel that maintain and repair the pole. The composite material is also a dielectric which significantly reduces the amount of electrical current that drains to the ground, thereby increasing the energy efficiency of the power system. The composite pole assembly is generally immune to corrosive ambient conditions and is not susceptible to being struck by lightening. The composite material may be wrapped with a cloth that contains ultraviolet additives which provide protection to solar energy.

The assembly 10 includes a pole 12 that is attached to a sleeve 14. The sleeve 14 may have a base 16 that is buried into the ground or may be bolted to a base to anchor the pole 12. Alternatively, the pole 12 may be bolted. The sleeve 14 preferably has an inner cavity that has the same profile as the shape of the pole 12, so that the pole 12 can be slipped into or over the sleeve 14. The assembly 10 typically includes arms 18 that support electrical wires 20. The assembly 10 may also have a top 22. The top 22 may be conical in shape to prevent birds from perching on the pole. The top 22 may have an inner lip 26 that is inserted into the pole 12.

Figure 2:
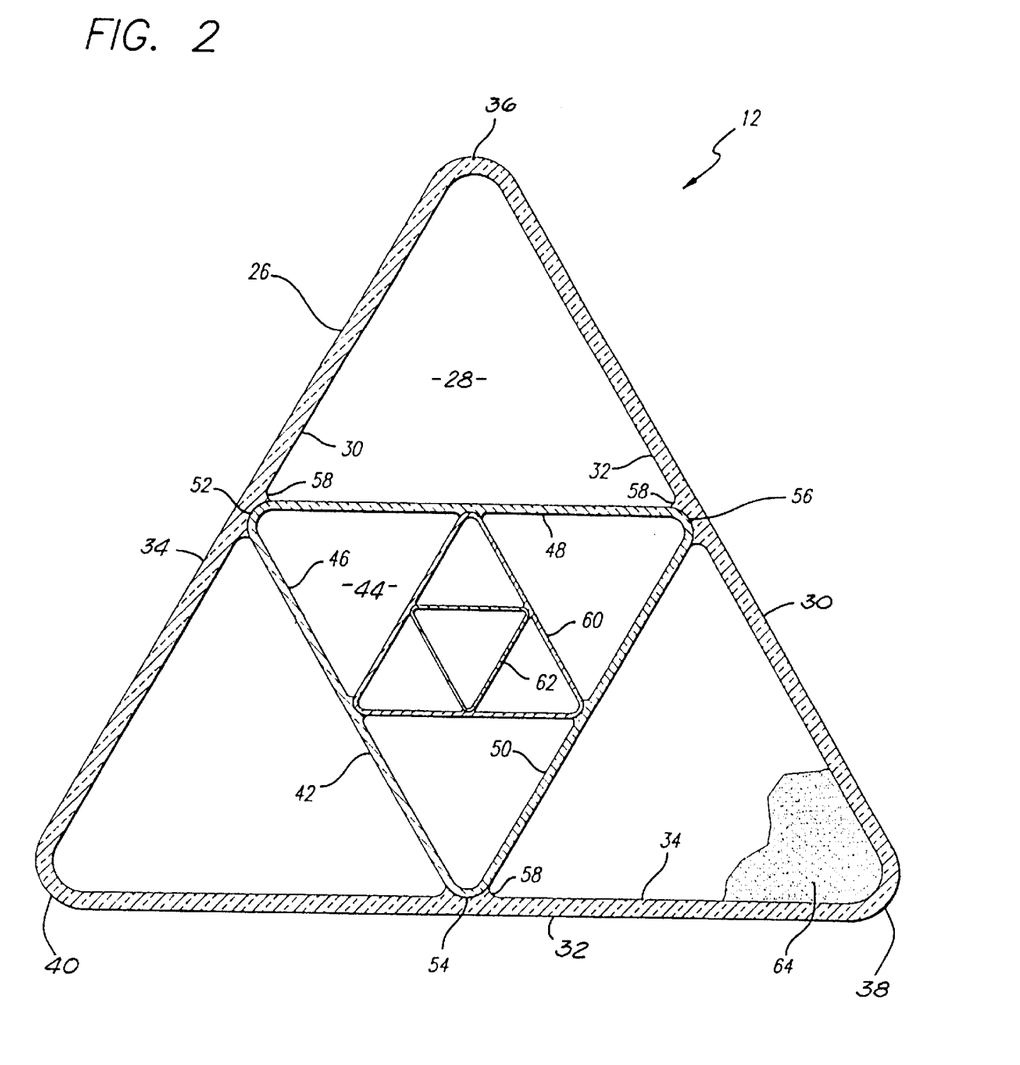
FIG. 2 is a cross-sectional view of the telephone pole.

FIG. 2 shows a preferred embodiment of the pole 12. The pole 12 has a first triangular shaped composite member 26 that has an inner channel 28. The inner channel 28 is defined by three walls 30, 32 and 34 that intersect at corresponding apexes 36, 38 and 40. Within the inner channel 28 is a second triangular shaped composite member 42. The second member 42 also has an inner channel 44 defined by three walls 46–50 that intersect at three corresponding apexes 52–56. The apexes 52–56 of the second member 42 intersect with the walls 30–34 of the first member 26 so that the walls 46–50 extend across the inner channel 28. In the preferred embodiment, the apexes 52–56 intersect with the midpoint of the walls 30–34. The walls 30–34 may have cups 58 that seat the second member 42 within the inner channel 28.

The walls 46–50 of the second member 42 provide structural support for the first member 26 and provide a relatively rigid composite utility pole. The stiffness of the pole allows the composite members to be constructed with a thinner wall than a pole without the cross-support. The thinner walls creates a relatively light weight pole. The stiffness of the pole can be increased by nesting third 60 and fourth 62 triangular shaped composite members within the second composite member 42. The inner spaces of the composite members can be filled with a foam 64 that further increases the structural integrity of the pole. The components of the assembly can be bonded together by a cured filmed, adhesive or other means of attaching together the various parts of the pole.

Figure 3A:
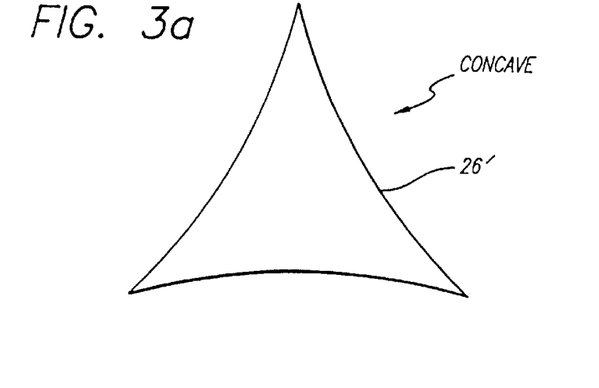
FIGS. 3a, 3b, 3c and 3d are alternate embodiments of the telephone pole.
Figure 3B:
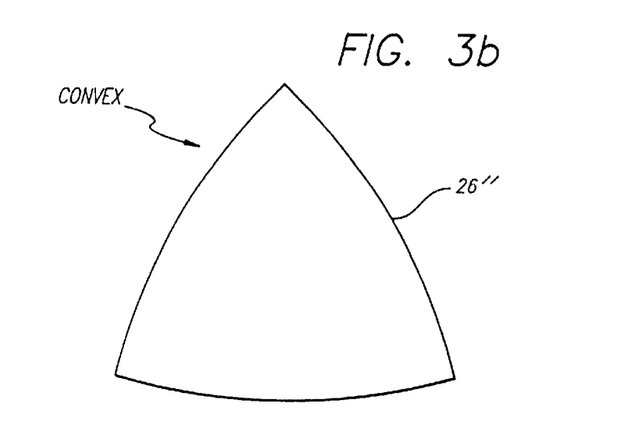
Figure 3C:
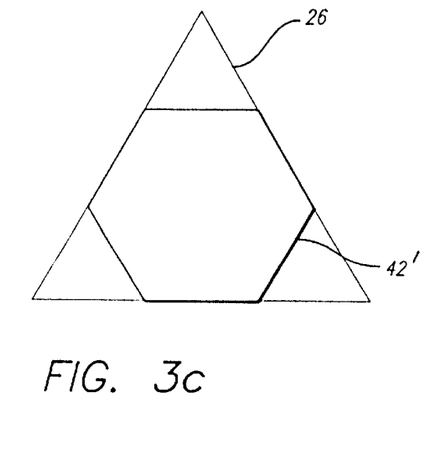
Figure 3D:
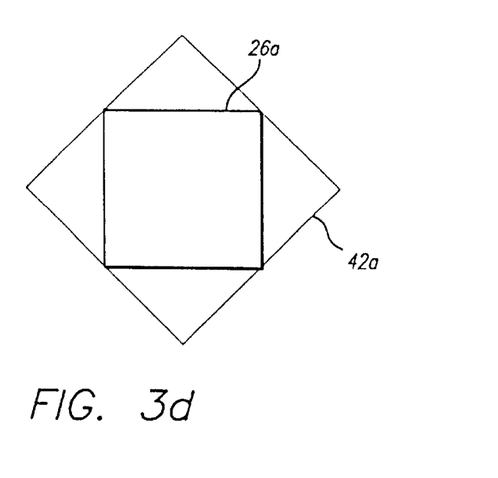

FIGS. 3a and 3b show alternate embodiments of the members, wherein the first members 26' and 26" have concave and convex shaped walls, respectively. The concave/convex walls provide a more aerodynamic pole that is less susceptible to wind shear. FIG. 3c shows another alternate embodiment, wherein the second member 42' has a hexagonal cross-section. FIG. 3d shows yet another alternate embodiment that contains a pair of rectangular shaped members 26a and 42a.

Figure 4A:
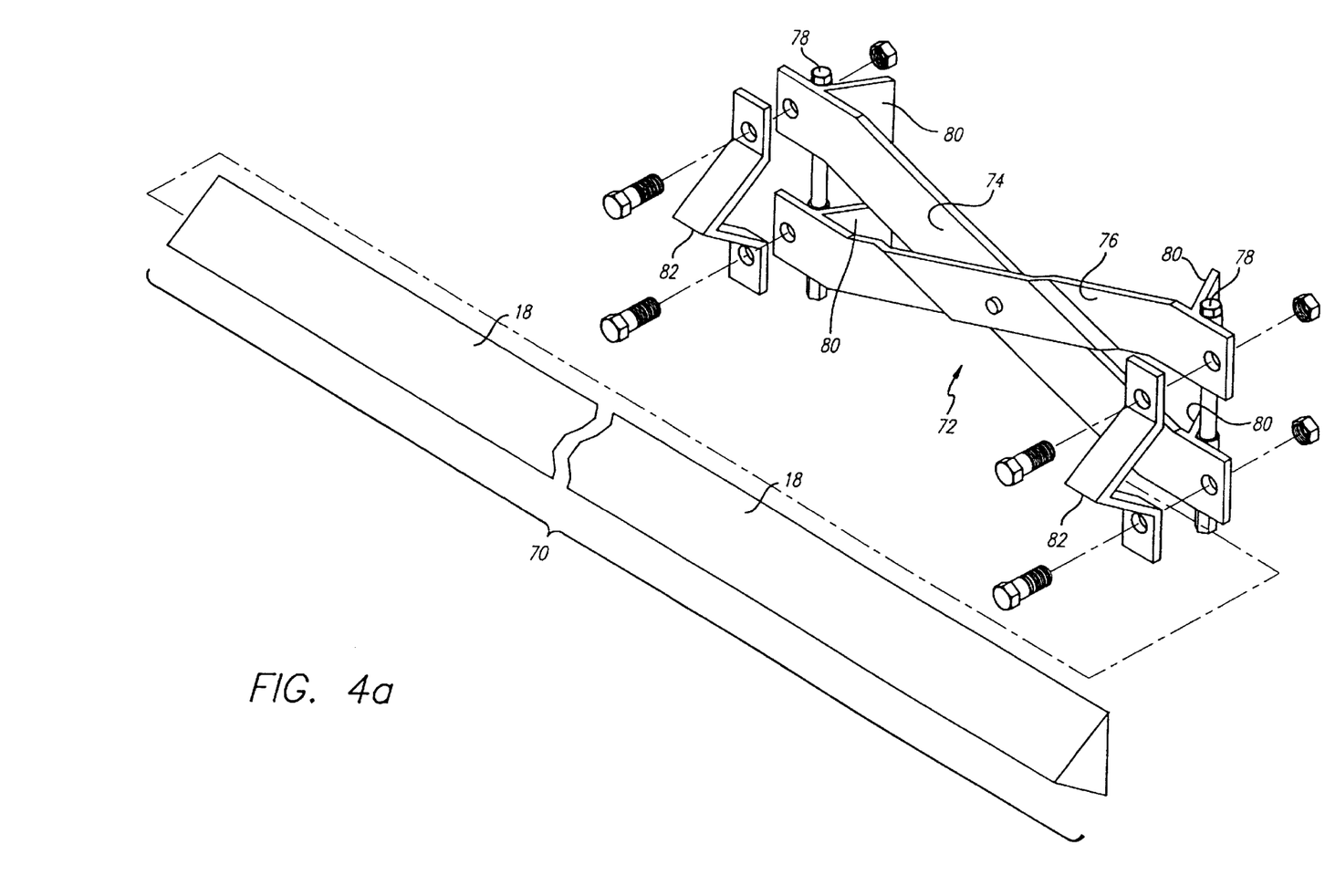
FIG. 4a is an exploded view of an arm attachment assembly.
Figure 4B:
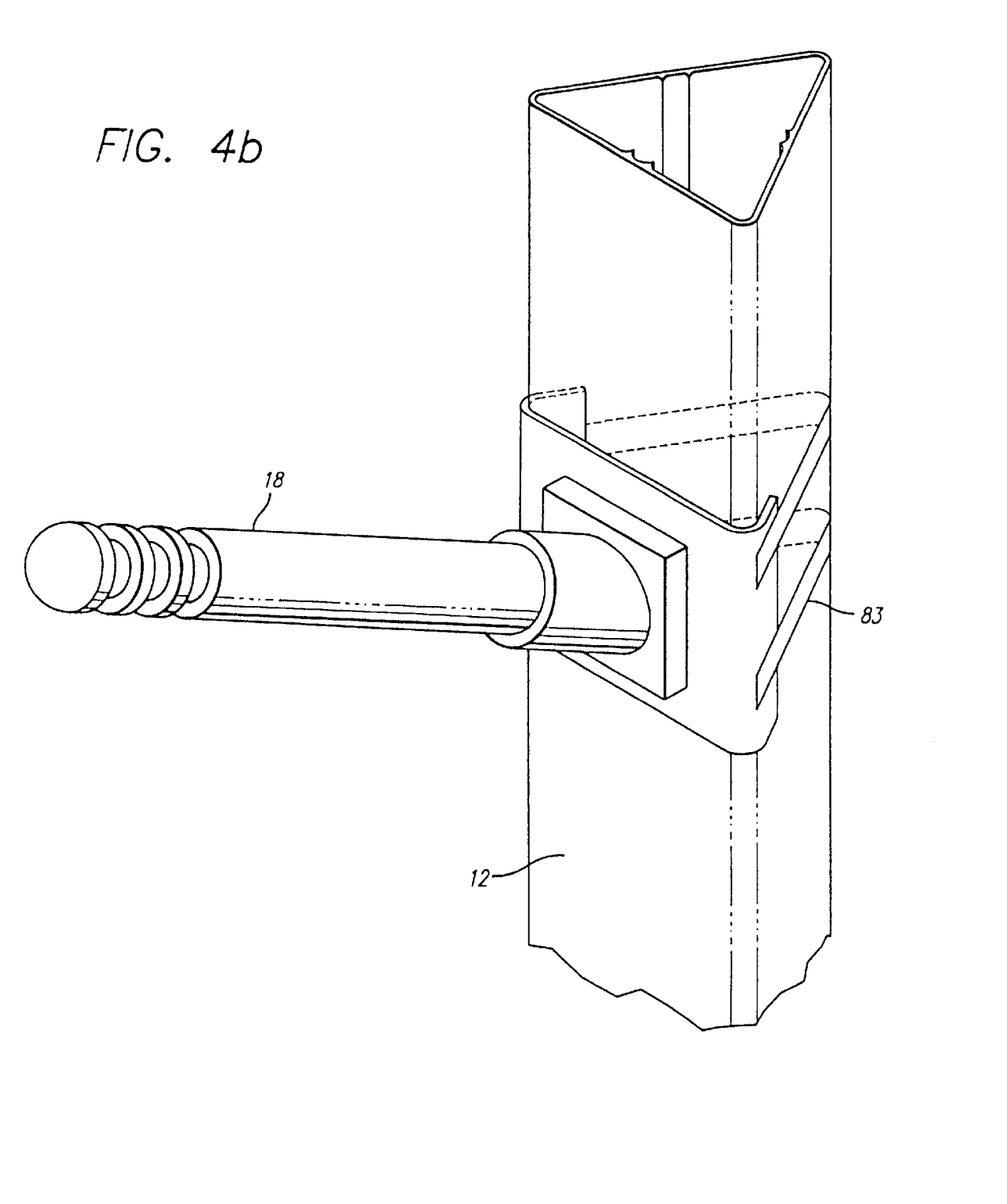
FIG. 4b is a perspective view of an arm mounting bracket.

FIG. 4a shows an arm attachment assembly 70 that can be attached to the pole 12. The assembly includes an attachment member 72 which has two crossed beams 74 and 76. The attachment member 72 is mounted to one of the pole walls by a fastener 78. The attachment member 72 has a number of leg portions 80 that are adjacent to the walls of the pole and prevent rotation of the beams 74 and 76 relative to the pole 12. An arm 18 is clamped to the attachment member 72 by a pair of clamps 82 that are fastened to the beams 74 and 76. The attachment member 72, arm 18 and clamps 82 can all be constructed from a composite material. FIG. 4b shows an arm mounting bracket 83 is strapped to the pole 12 and supports an arm 18 which extends from the pole 12 at an angle.

Figure 5:
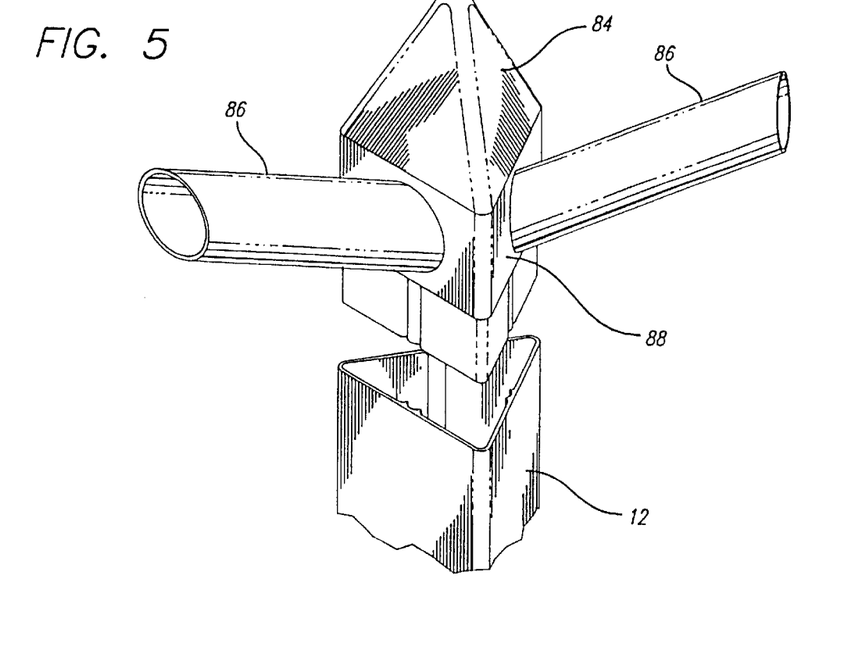
FIG. 5 is an exploded view of an arm that is attached to a top portion of the telephone pole.

FIG. 5 shows an alternate pole assembly which has a top 84 that is inserted into the pole 12 and which has a pair of arms 86 that extend from a base portion 88 and support the electrical wires.

Figure 6:
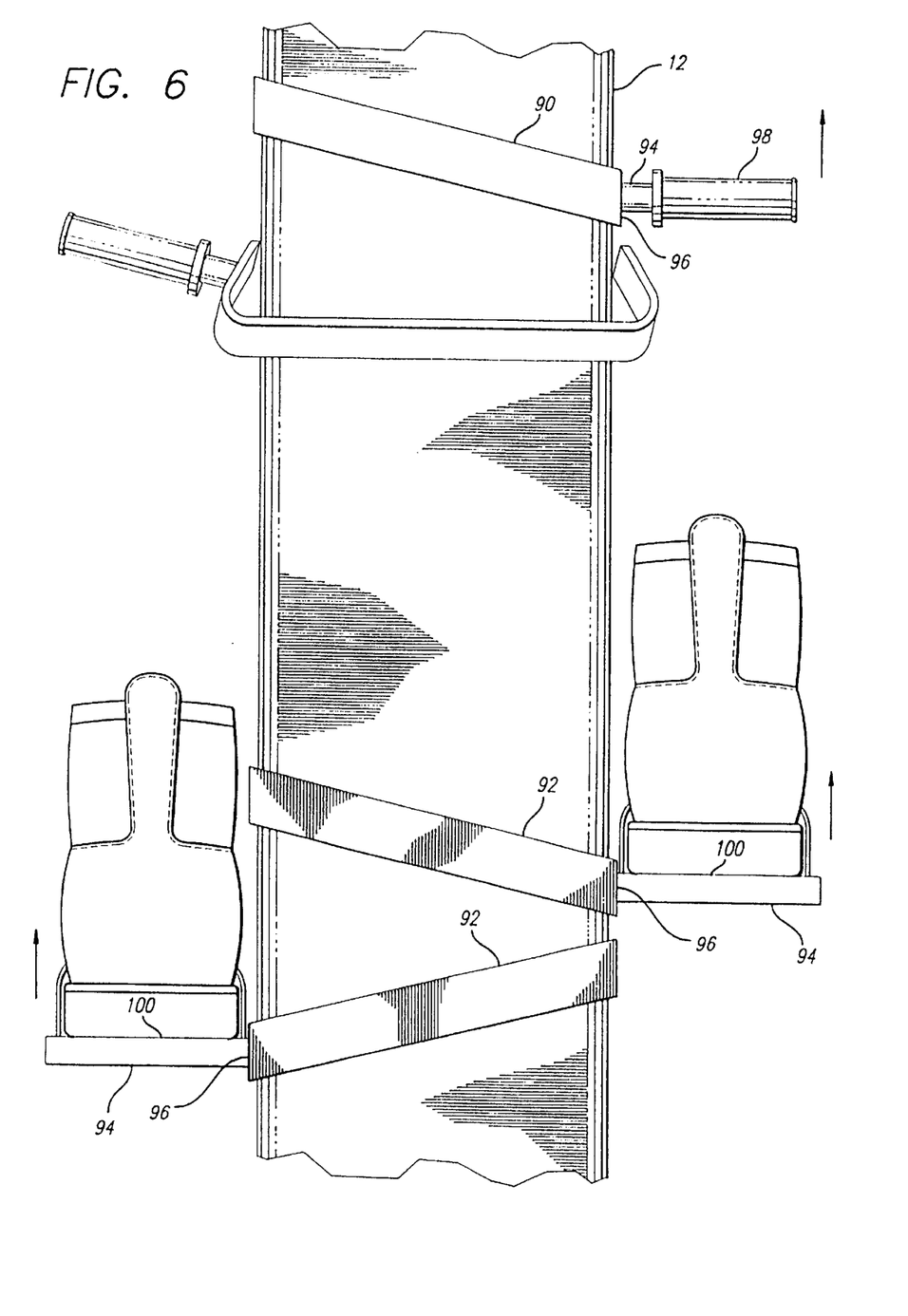
FIG. 6 is a perspective view showing a hand climbing device and a foot climbing device coupled to the utility pole.

FIG. 6 shows a hand climbing device 90 and a foot climbing device 92 that can be used by utility personnel to climb the pole 12. The climber typically utilizes separate hand 90 and foot 92 devices for each hand and foot, respectively. Each device has a pair of leg portions 94 that extend from a base portion 96. The dimensions and stiffnesses of the devices are such that the leg portions 94 will normally clamp the pole 12 and maintain the position of the climber. To release and move the hand device 90, the climber can pull on a handle 98 to move the adjacent leg portion 94 away from the pole wall. Likewise, the foot device 92 can be moved relative to the pole by pulling on a foot platform 100 that moves the adjacent leg portion away from the pole and releases the device from the pole walls. The devices 90 and 92 have enough resiliency to spring back and clamp the pole 12 when the hand/platform is released by the utility personnel. The climber can scale the pole by continuously pulling, moving and releasing the devices 90 and 92.

Figure 7:
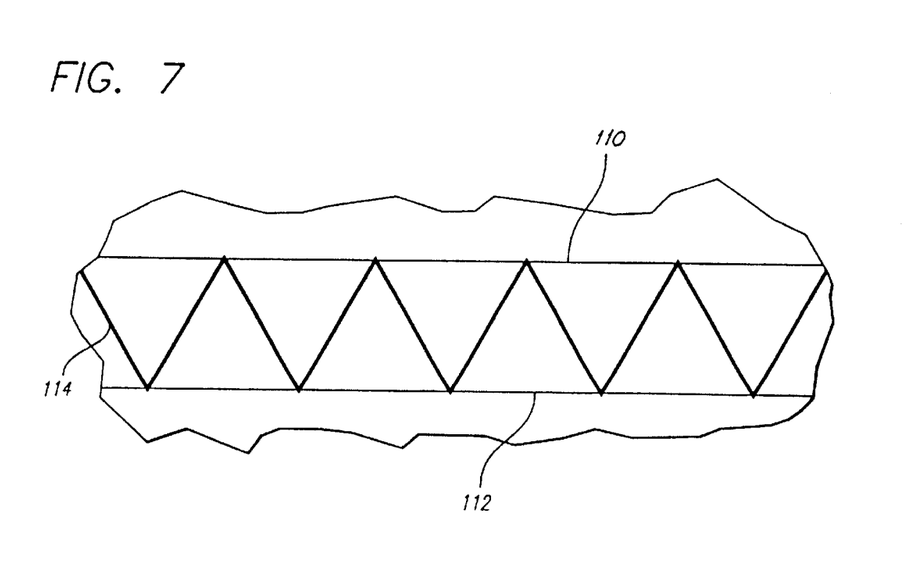
FIG. 7 is a top view showing a weave of the utility pole composite material.

FIG. 7 shows a preferred embodiment for constructing the composite material. The composite may have a first string 110 of reinforcing material that is essentially parallel with a second string 112 of reinforcing material. A third string 114 of reinforcing material is then weaved or stitched between the two strings in a pattern that creates a plurality of triangles. The third string 114 provides structural support for the first 110 and second 112 strings. The resin impregnated reinforcing strings are typically a fiberglass or other conventional composite reinforcing material. The reinforcing material is typically impregnated with a resin. The composite is typically extruded or pultruded into the shape of a pole component.

Figure 8:
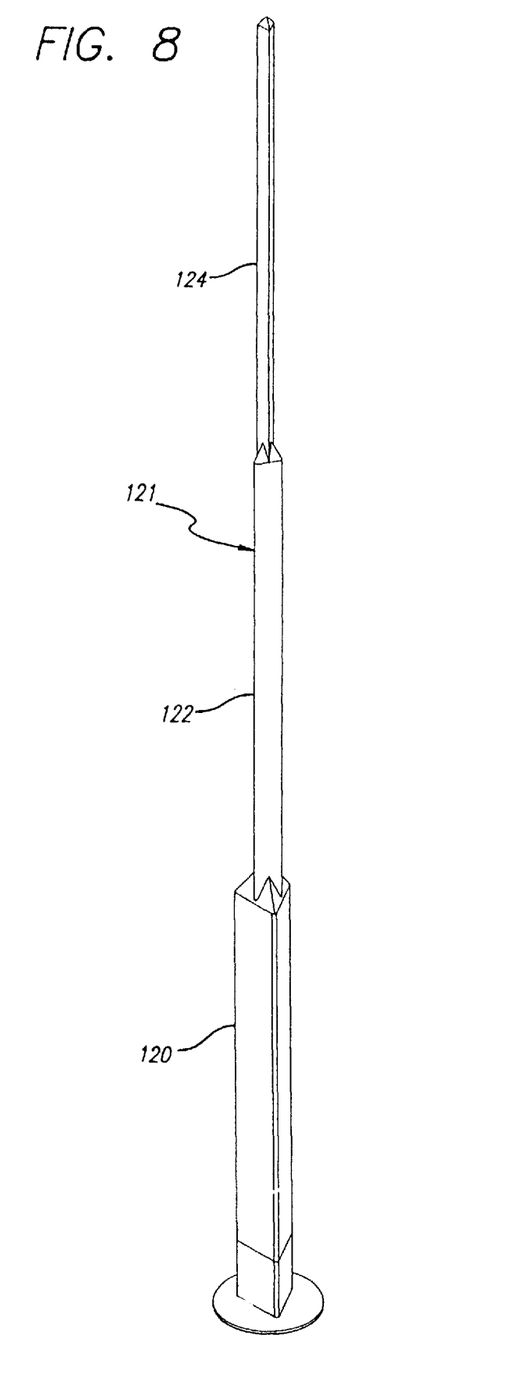
FIG. 8 is a perspective view of a tiered pole.
Figure 9:
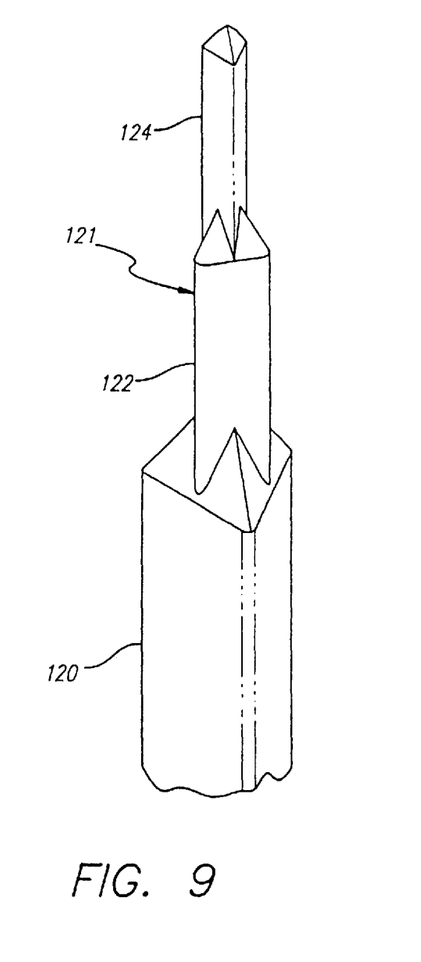
FIG. 9 is a perspective view showing the tiers of the pole.

FIGS. 8 and 9 show an alternate embodiment of a tiered pole 121. Such a pole 121 can be constructed to be 120 feet long or more, thereby providing a single high extension utility unit. The pole 121 is constructed into three tiered sections 120, 122 and 124 with descending cross-sectional areas. Additional tiers may be added. Tiering the pole reduces the weight without compromising the structural integrity of the pole.

Figure 10:
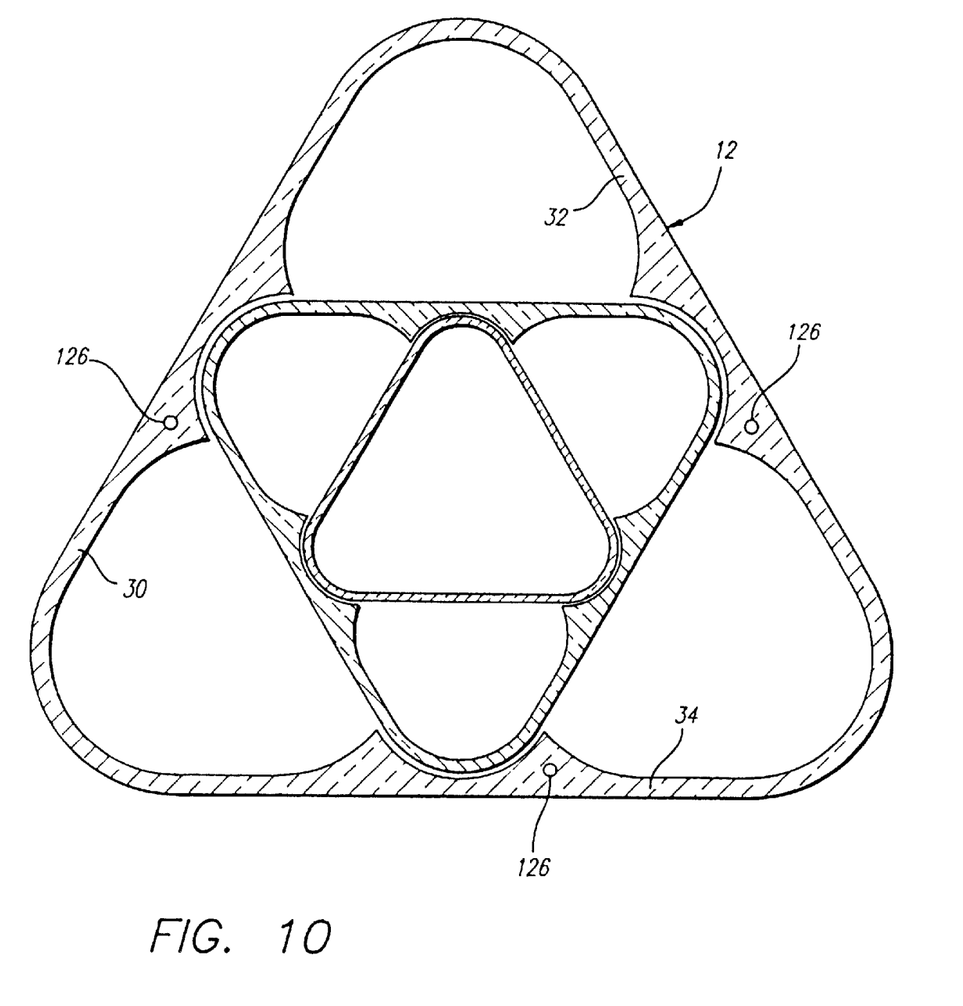
FIG. 10 is a cross-sectional view of a pole with fiber optic elements embedded within the walls.

FIG. 10 shows an alternate embodiment of a pole 12 with fiber optic cables 126 that are embedded within the walls 30–34. The fiber optic cables typically run along the length of the pole.

Figures 11, 12:
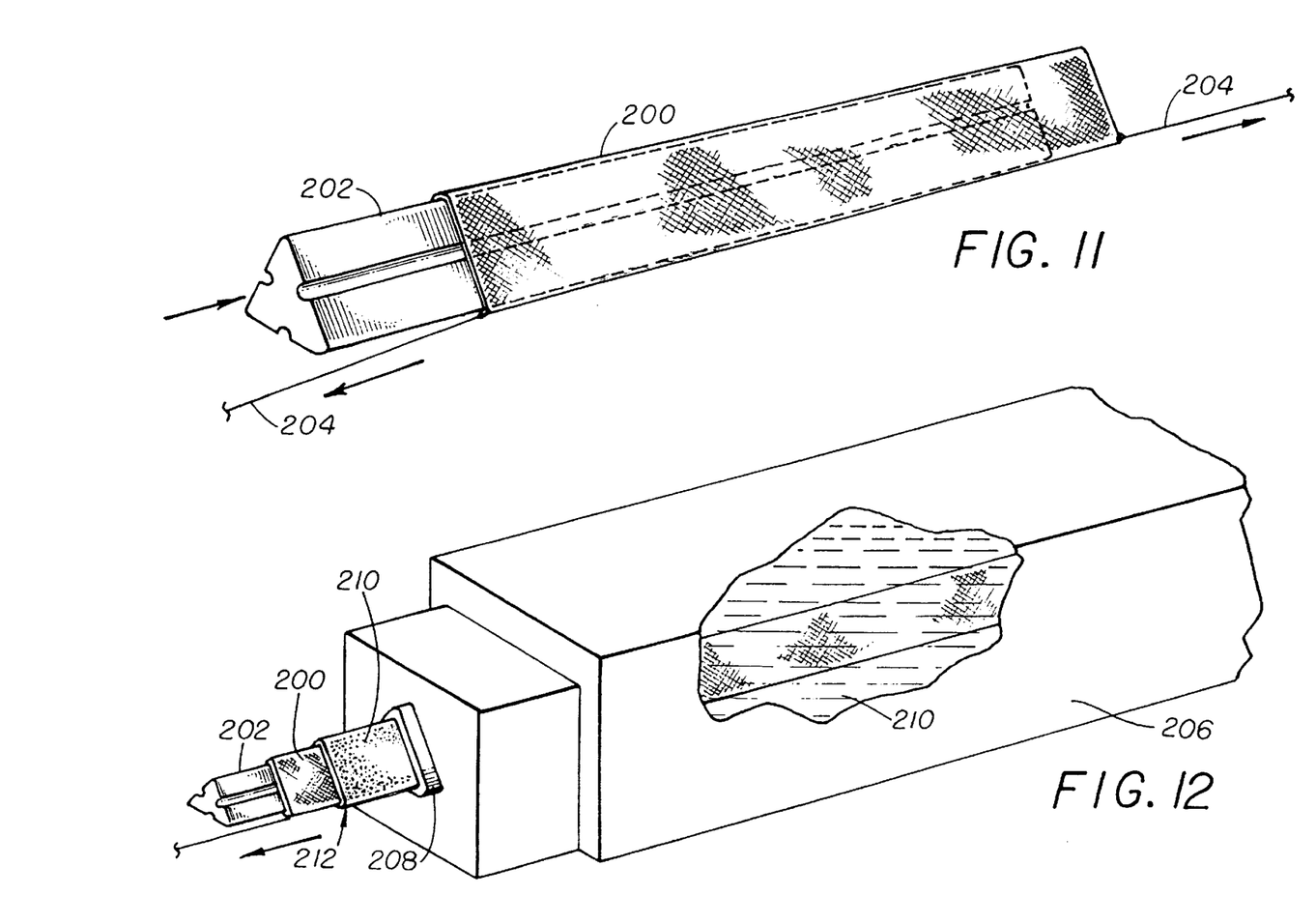
FIG. 11 is a perspective view showing an inner mold being inserted into a woven sock.
FIG. 12 is a perspective view showing the inner mold and woven sock being pulled through an outer mold.

FIGS. 11 and 12 show a preferred method for constructing a utility pole with a pultrusion process. A sock 200 is initially constructed from a woven and/or knitted fiber such as fiberglass. An inner mold 202 is then placed into the sock 200. Each end of the sock 200 has a rope 204, that is preferably constructed from KEVLAR. The rope 204 is pulled to expand the sock 200 and place the fibers in tension.

The inner mold 202 and tensioned sock 200 are passed through a resin bath 206 and pulled through an outer die 208 by a pultrusion machine. The inner 202 and outer 208 molds are preferably heated to set the resin into its final form. The pultrusion process/injection system 18 impregnates the resin 210 into the tensioned woven sock 200. The tensioned resin impregnated sock hardens to create a pultruded member 212. The pre-tensioning of the sock 200 increases the stiffness of the member 212. The pultruded member 212 is subsequently cut into individual utility pole pieces which are then assembled to create utility poles.

Figures 13, 14:
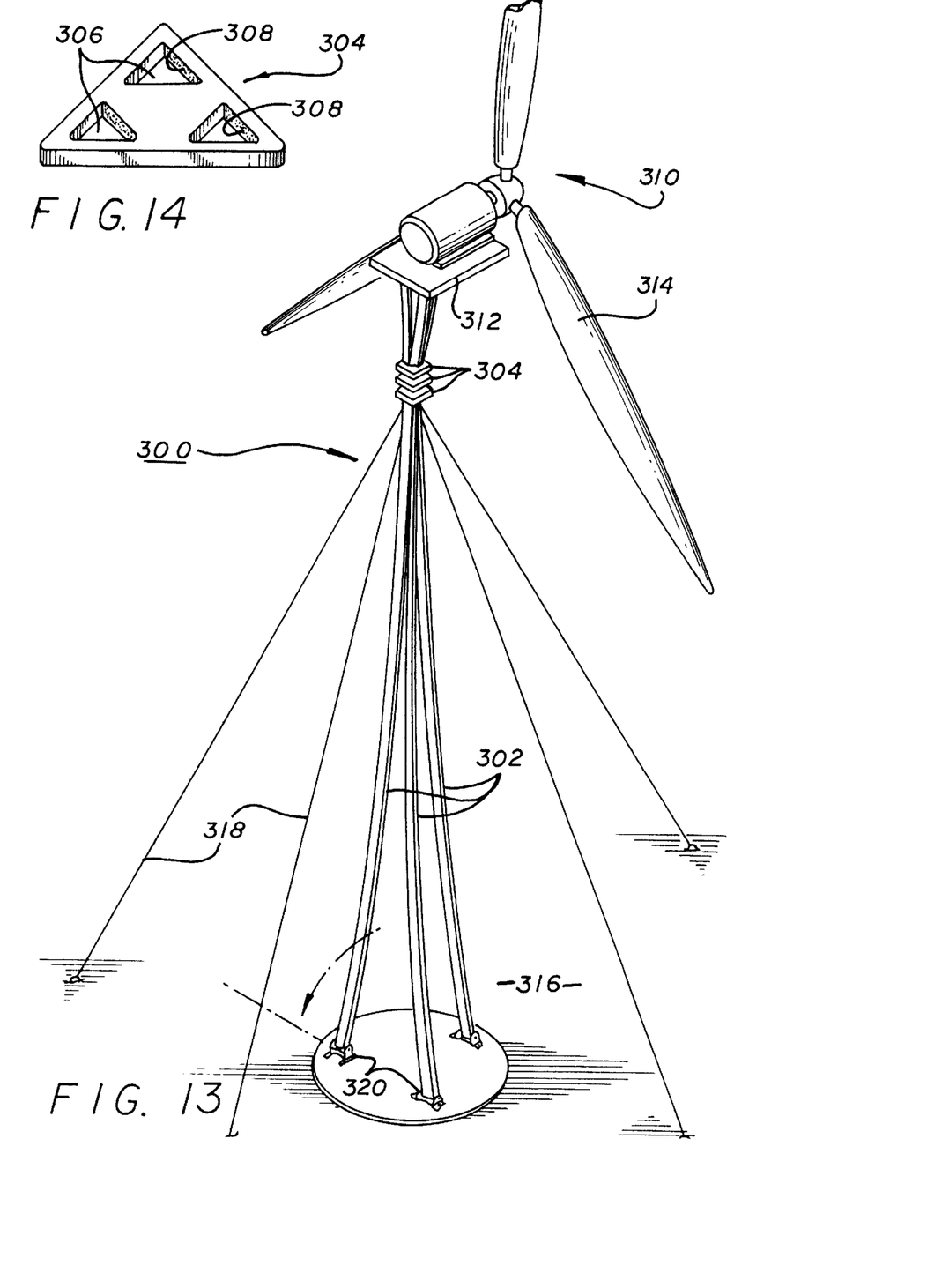
FIG. 13 is a perspective view showing a plurality of beams in a truss structure that supports a windmill power generator.
FIG. 14 is a perspective view of a coupler which couples together the composite beams within the truss structure.

FIG. 13 shows a truss structure 300 assembled from a plurality of composite beams 302. The structure 300 may include three separate composite beams 302 coupled together by a plurality of couplers 304. Each composite beam 302 may have a curvature along the longitudinal axis of the beam 302. In addition to connecting the composite beams 302, the couplers 304 may also distribute loads between the beams 302.

FIG. 14 shows an embodiment of a coupler 304. The coupler 304 may include clearance holes 306 which receive the composite beams. The beams may be attached to the coupler 304 by an adhesive 308 that is applied to the inner surface of the holes 306. In one embodiment, the coupler 304 is constructed from a composite material.

Referring to FIG. 13 the truss structure 300 may support a windmill power generator 310. The generator 310 may be supported by a platform 312 that is attached to the beams 302. The power generator 310 may have a plurality of blades 314 that are rotated by wind forces. Rotation of the blades 314 may drive an electrical generator (not shown) which produces electricity as is known in the art. The truss structure 300 typically supports the generator 100 feet or more above a ground surface 316.

The structure 300 may be tethered by a plurality of guide wires 318 that are mounted to the surface 316. Two of the beams 302 may be mounted to the surface 316 by hinges 320 which allow an operator(s) to untie the wires 318 and lower the generator 310 to the ground 316. The remaining beam 302 may be connected by a pin (not shown) which can be removed to allow rotation of the two other beams 302.

Figure 15:
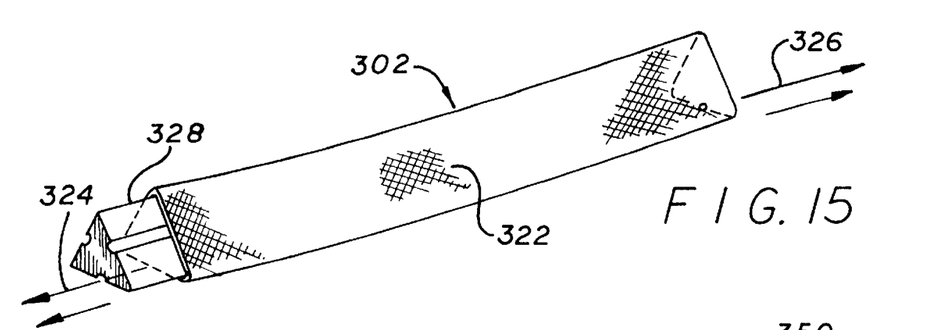
FIG. 15 is a perspective view similar to FIG. 11 showing a curvature being formed in a beam stock.

FIG. 15 shows a method for creating the curved composite beams 302. There is initially provided a woven sock 322 which has a pair of pull strings 324 and 326. The sock 322 is placed over a mold 328. The pull strings are pulled in opposite directions so that one side of the woven sock 322 is in tension and the other side of the sock 322 is in compression. The off-center pulling force on the woven sock 322 creates a curvature in a resultant beam stock. The stock is periodically cut to create the individual beams 302. The sock 322 is pulled through a resin bath (not shown) and a pultrusion mold (not shown) in this condition.

Figure 16:
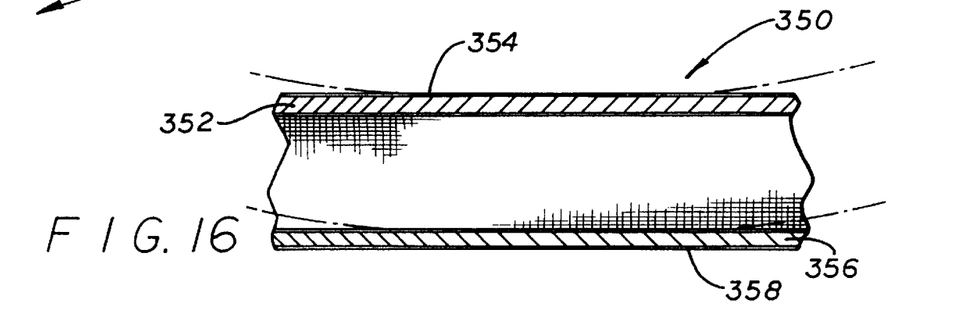
FIG. 16 is a cross-sectional view of an alternate embodiment of a beam.

FIG. 16 shows an alternate embodiment of a composite beam 350 which has a first material 352 within a first side 354 of the beam 350 and a second material 356 within a second side 358 of the beam 350. The first material 352 may have a coefficient of thermal expansion that is different than the thermal expansion coefficient of the second material 356. By way of example, the first material 352 may be a glass mat and the second material 356 may be a carbon mat.

The first 352 and second 356 materials may be incorporated into the sock 322 shown in FIG. 15. The resin bath may be heated so that the first 352 and second 356 materials expand while being pulled through the bath and the pultrusion mold. The resin embedded sock 322 is then allowed to cool to the ambient temperature. The first 352 and second 356 materials expand and contract at different rates so that the resultant cooled beam has a curvature.

Figures 17, 18:
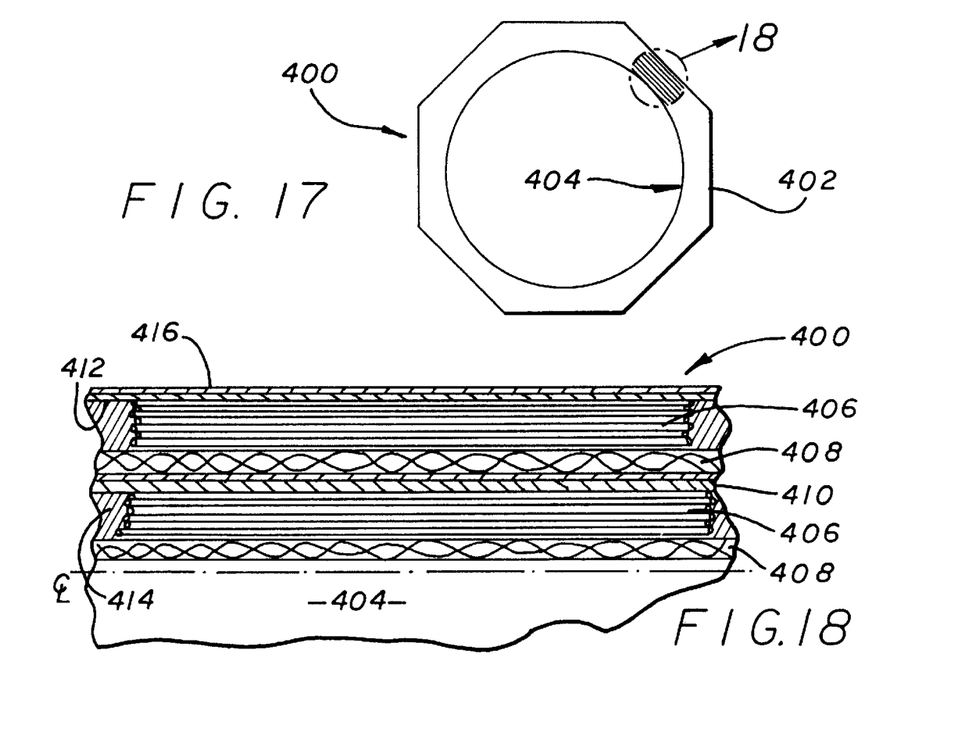
FIG. 17 is top view of an alternate embodiment of a beam.
FIG. 18 is an enlarged cross-sectional view of the beam of FIG. 17.

FIG. 17 shows another embodiment of a composite utility pole beam 400. The beam 400 may have a polygonal outer surface 402 and a circular shaped inner channel 404. By way of example, the outer surface 402 may have an octagonal shape. Providing an inner channel 404 that is circular in shape eliminates stress concentrators found in non-circular shaped inner channels of the prior art. Providing a polygonal shaped outer surface minimizes the weight and material cost of the utility beam 400 without significantly reducing the structural integrity of the beam 400.

FIG. 18 shows a cross-section of the beam 400. The beam 400 may include a number of rovings 406 located adjacent to a pair of fabrics 408. The rovings 406 may include a bundle of untwisted fibers located in a 0° orientation. The fabrics 408 may each contain a plurality of fibers, such as fiberglass, that are woven or knitted. The weave or knit may be either two or three dimensional.

A mat 410 may be placed between the fabrics 408. The mat 410 can be constructed from layered down continuous, or chopped, rovings that are formed into a sheet with, or without, a binder. The beam 400 may further have an outer veil 412. The outer veil 412 may be a non-woven mat which includes a polyester, rayon, nylon, carbon or other fiber structure. The rovings 406, fabrics 408, mat 410 and veil 412 are folded into a sock that may be pulled through a resin bath and pultrusion mold so that a resin 414 is embedded therein. The outer veil 412 captures the outer rovings 406 during the pultrusion process. The outer veil 412 may also provide protection to energy having an ultraviolet frequency. The beam 400 may be coated with an outer layer 416 which provides protection from ultraviolet light.

Figures 19, 20, 21:
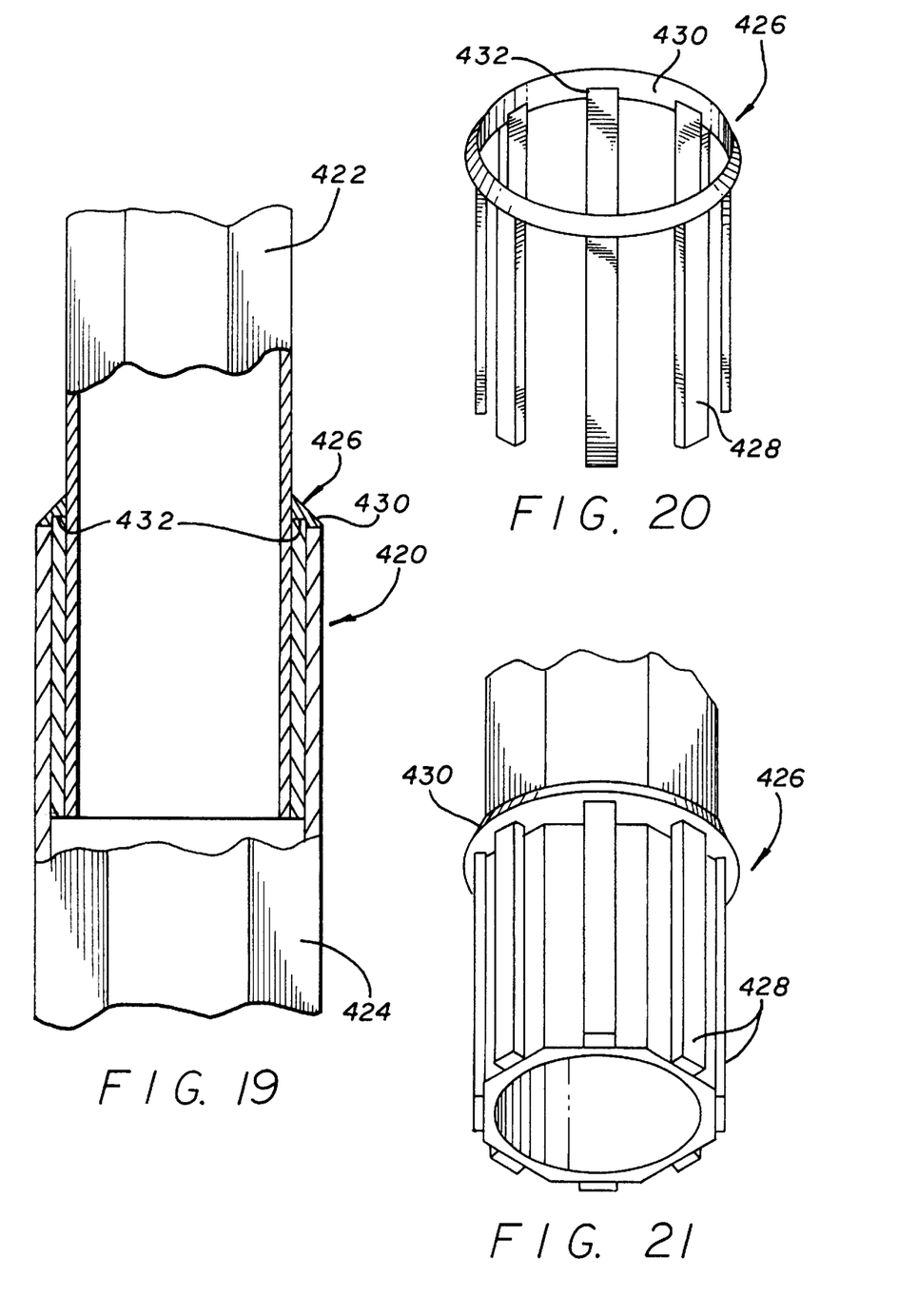
FIG. 19 is a side sectional view of a utility pole.
FIG. 20 is a perspective view of a joining plug for the utility pole.
FIG. 21 is a perspective view of the joining plug attached to a first composite beam of the utility pole.

FIG. 19 shows an embodiment of a composite utility pool assembly 420. The pole 420 may have a first composite beam 422 and a second composite beam 424. Each beam 422 and 424 may have a polygonal shaped outer surface and circular inner channel as shown in FIG. 17. The second beam 424 may provide a base structure that is mounted to a ground surface. The first beam 422 is preferably smaller than the second beam 424 to reduce the weight in the upper end of the pole 420. The larger second beam 424 provides additional strength to support the pole 420. The beams 422 and 424 may be connected by a joining plug 426.

As shown in FIGS. 20 and 21, the joining plug 426 may include a plurality of joining beams 428 that are attached to a retainer ring 430. The ring 430 may have slots 432 that receive the ends of the beams 428. The beams 428 and ring 430 may be bonded to the outer surface of the first beam 422. The plug 426 can then be inserted into the inner channel of the second beam 424 and bonded to the beam 424.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A pole, comprising:
   a composite beam which has a polygonal shaped outer surface and an inner channel, the composite beam including rovings of fibers located in a 0° orientation and layers of fabrics or mats imbedded in resin.

2. The pole as recited in claim 1, wherein said outer surface has an octagonal shape.

3. The pole as recited in claim 1, further comprising a joining plug that is attached to said composite beam.

4. The pole as recited in claim 3, wherein said joining plug includes a plurality of plug beams that are attached to a retainer ring.

* * * * *

UNITED STATES PATENT AND TRADEMARK OFFICE
CERTIFICATE OF CORRECTION

PATENT NO.   : 6,155,017
DATED        : December 5, 2000
INVENTOR(S)  : Turner et al.

It is certified that error appears in the above-identified patent and that said Letters Patent is hereby corrected as shown below:

<u>Title page,</u>
Item [54], Title, delete "TRUSS STRUCTURE" and insert -- A COMPOSITE POLE HAVING ROVINGS OF UNTWISTED FIBERS AND LAYERS OF FABRICS OR MATS IMBEDDED IN RESIN --.

Item [75], Inventors, "Phoenix, Ariz." insert -- ; James A. Meisel, Tempe, Ariz. --.

Item [56], References Cited, in the first entry, delete "Mengden" and insert -- Von Mengden --.

Signed and Sealed this

Second Day of April, 2002

JAMES E. ROGAN
*Director of the United States Patent and Trademark Office*

*Attest:*

*Attesting Officer*